United States Patent [19]
Nodelman

[11] Patent Number: 6,140,661
[45] Date of Patent: Oct. 31, 2000

[54] LOADER WITH A MATCHING FINGER THAT LOADS A HEAD GIMBAL ASSEMBLY ONTO A DISK

[75] Inventor: Semyon Nodelman, San Diego, Calif.

[73] Assignee: Phase Metrics, Inc., San Diego, Calif.

[21] Appl. No.: 09/149,205

[22] Filed: Sep. 8, 1998

[51] Int. Cl.[7] .............................. G01V 21/86; G11B 15/60

[52] U.S. Cl. .................... 250/559.29; 356/357; 356/375; 360/130.31; 360/104

[58] Field of Search .......................... 250/559.27, 559.28, 250/559.29; 248/55, 371, 397; 356/243.3, 357, 361, 375, 73; 360/75, 76, 104, 105, 106, 107, 103, 128, 130.31, 130.32

[56] References Cited

U.S. PATENT DOCUMENTS

| 5,675,082 | 10/1997 | Marr et al. | 73/432.1 |
|---|---|---|---|
| 5,696,653 | 12/1997 | Lacey | 360/104 |
| 5,767,964 | 6/1998 | Wahl et al. | 356/357 |
| 5,786,677 | 7/1998 | Marr | 318/560 |

*Primary Examiner*—Stephone B. Allen
*Attorney, Agent, or Firm*—Irell & Manella LLP

[57] ABSTRACT

A loader that loads a head onto a disk. The head is typically mounted to a flexure arm which has a rail. The rail may have a top edge. The loader has a finger which can engage the flexure arm at a location that does not make contact with the top edge of the rail. With the present invention the finger can remain adjacent to the flexure arm even after the head is loaded onto the disk. There is no requirement to retract the finger after loading the head.

14 Claims, 4 Drawing Sheets

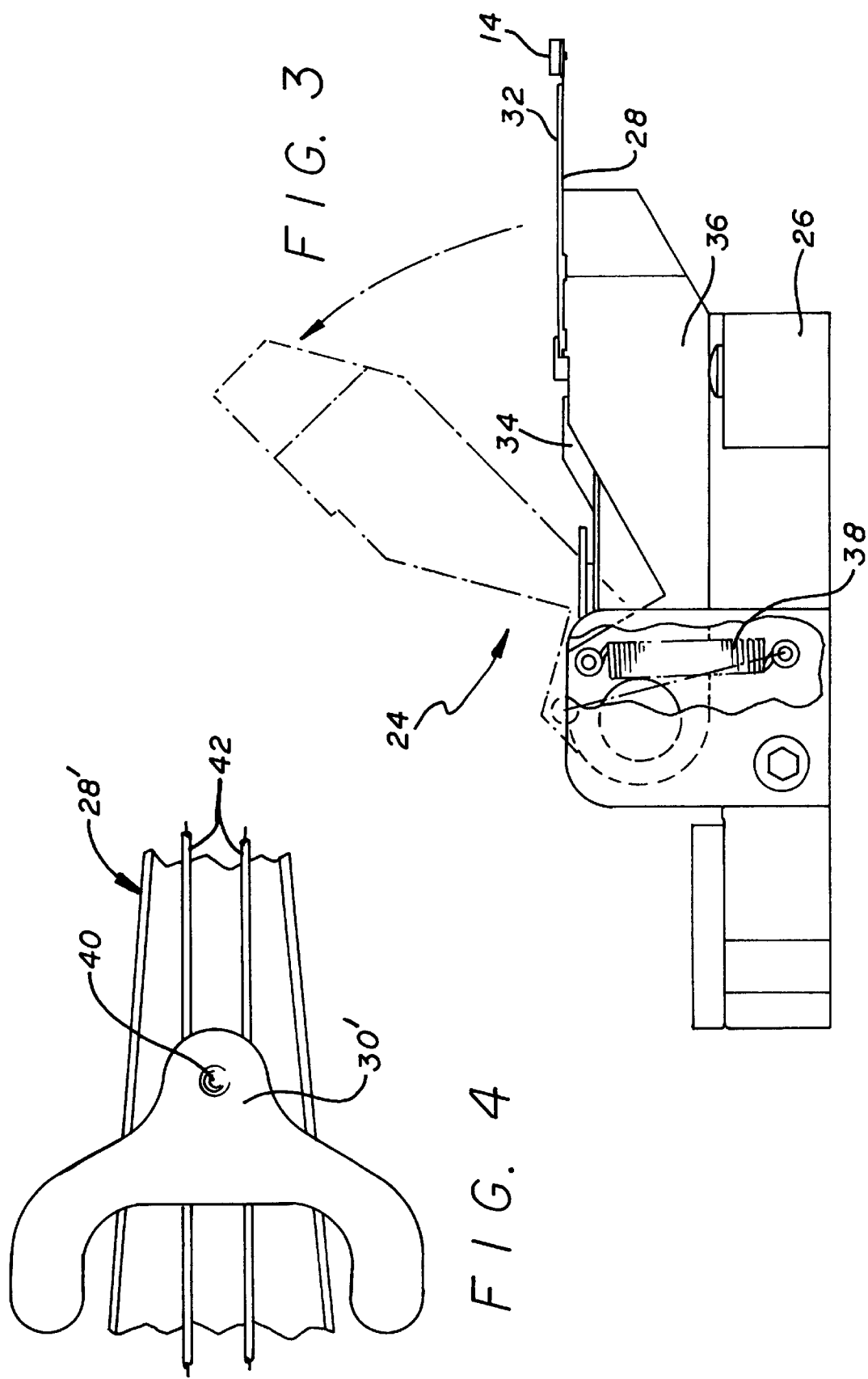

LOADER WITH A MATCHING FINGER THAT LOADS A HEAD GIMBAL ASSEMBLY ONTO A DISK

BACKGROUND OF THE INVENTION

1. Field of the Invention

The present invention relates to a loader that places a head of a hard disk drive adjacent to a disk.

2. Background Information

Hard disk drives contain magnetic transducers which write and read information onto a rotating magnetic disk(s). The transducers are typically integrated into a head that is assembled to a flexure arm. Some heads contain a transducer to write information and a separate transducer to read information. The read transducer may be constructed from a magneto-resistive (MR) material. The head and arm are commonly referred to as a head gimbal assembly (HGA). Each HGA is attached to an actuator arm and a voice coil motor that can move the heads across the surfaces of the disk(s).

Each head has an air bearing surface which cooperates with an air flow generated by the rotating disk(s) to create an air bearing between the disk and the transducer. The air bearing prevents mechanical wear between the head and the disk surface. It is desirable to minimize the length of the space which separates the transducer and the disk to maximize the magnetic coupling between the two components. Heads are therefore designed create an optimal space between the transducer and the disk.

It is desirable to measure the height of an air bearing created by a head. The height is typically measured with an optical system that places a head adjacent to a rotating transparent disk. A light beam is then directed through the transparent disk and reflected from the head back to a photodetector. The detected light is used to compute the "flying height" of the head.

Flying height testers typically include a loader which places the head adjacent to the transparent glass disk. The step of loading the head typically requires moving the head radially across a portion of the disk. Some flying height testers include a blade or finger that engages the flexure arm so that the head will not scratch the glass as the head moves across the disk. A scratch on the glass may distort the light reflected through the disk.

Most flexure arms have bent rail portions to increase the stiffness of the arms. The loader blades of the prior art typically extend across the rails in a direction that is perpendicular to the longitudinal axis of the flexure arms. The flexure arms are located in close proximity to the glass disk when the head is loaded onto the disk. There is typically not enough space for a blade or finger between the rails and the disk when the head is loaded. For this reason the blade must be retracted from the flexure arm before the head is loaded onto the disk. Retracting and reinserting the blade may bend and damage the flexure arm. Additionally, the loader requires an additional mechanism to retract and reinsert the blade. It would therefore be desirable to provide a loader blade that does not have to be removed after a head is loaded onto a disk.

SUMMARY OF THE INVENTION

One embodiment of the present invention is a loader that loads a head onto a disk. The head is typically mounted to a flexure arm which has a rail. The rail may have a top edge. The loader has a finger which can engage the flexure arm at a location that does not make contact with the top edge of the rail.

BRIEF DESCRIPTION OF THE DRAWINGS

FIG. 3 is a side view of the loader;

FIG. 4 is a top view of an alternate embodiment of a finger of the loader;

DETAILED DESCRIPTION

One embodiment of the present invention is a loader that loads a head onto a disk. The head is typically mounted to a flexure arm which has a rail. The rail may have a top edge. The loader has a finger which can engage the flexure arm at a location that does not make contact with the top edge of the rail. With the present invention the finger can remain adjacent to the flexure arm even after the head is loaded onto the disk. There is no requirement to retract the finger after loading the head.

Figure 1:
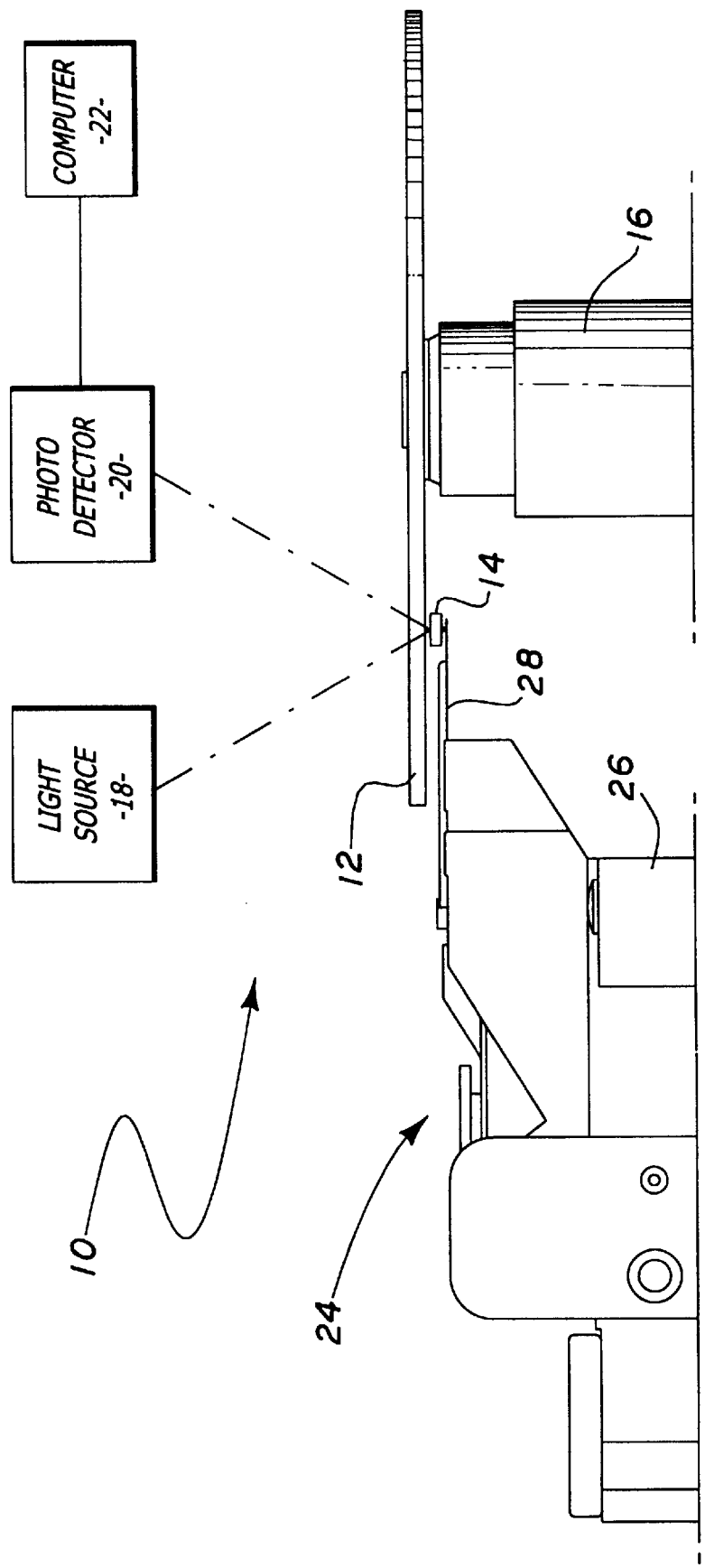
FIG. 1 is a schematic of an embodiment of a flying height tester of the present invention.

Referring to the drawings more particularly by reference numbers, FIG. 1 shows an embodiment of a flying height tester 10. The flying height tester 10 is used to measure the space between a disk 12 and a head 14. The space is commonly referred to as the "flying height" of the head 14. The disk 12 is typically constructed from an optically transparent material such as glass. The glass disk 12 may be rotated by a spin motor 16.

The flying height tester 10 includes a light source 18 which directs a light beam through the disk 12 and onto the head 14. Light is reflected from the head 14 into a light detector 20. The light detector 20 converts the optical energy into an electrical signal(s). By way of example, the light detector 20 may be a charged coupled device (CCD) camera. The light source 18 and the light detector 20 are connected to a computer 22 which can compute a space separating the head 14 and the disk 12 from the reflected light.

The flying height tester 10 may include a loader 24 which places the head 14 adjacent to the disk 12. The loader 24 includes a base plate 26 that supports a flexure arm 28. The flexure arm 28 is attached to the head 14. The arm 28 and head 14 are commonly referred to as a head gimbal assembly (HGA). The base plate 26 can be attached to a linear actuator (not shown) that can move the head 14 radially across the disk 12. The loader 24 may also include a cam mechanism (not shown) that can move the head 14 toward, and away from, the surface of the disk 12.

The flying height tester 10 may reflect light from the head/disk interface to compute the flying height of the head 14. After the flying height is determined the flexure arm 28 and head 14 are unloaded and retracted from the disk 12, and then replaced with another HGA. The measured HGA is eventually assembled into a hard disk drive. An operator typically loads a single HGA onto the loader 24 which is then actuated to load the head 14 onto the disk 12.

Figure 2:
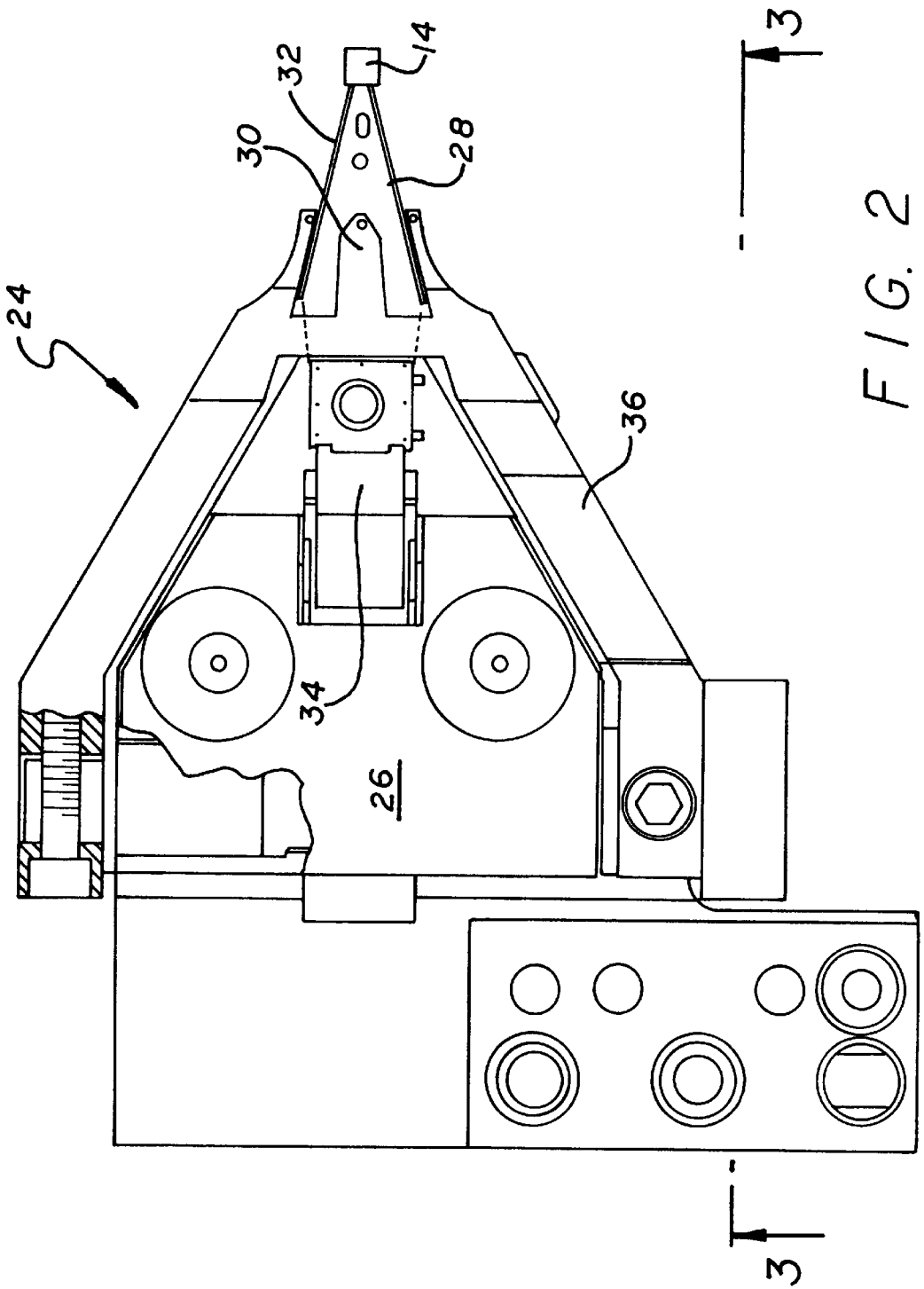
FIG. 2 is a top view of an embodiment of a loader of the flying height tester.

FIGS. 2 and 3 show an embodiment of a loader 24. The loader 24 may include a finger 30 that is pivotally connected to the base plate 26. The finger 30 engages the flexure arm 28 to insure that the head 14 does not make contact with the disk 12 when the linear actuator (not shown) is moving the head 14 across the disk 12.

The flexure arm 28 typically has a pair of bent rail portions 32 to increase the stiffness of the arm 28. The shape of the finger 30 is such that it does not come into contact with a top edge of the rails 32 when engaged with the flexure arm 28. Additionally, the thickness of the finger 30 is less than the space which separates the disk 12 from the non-rail portion of the flexure arm 28 so that the finger 30 does not have to be retracted when the head 14 is loaded onto the disk 12. It being understood that there are many different shapes of flexure arms 28. The finger 30 is preferably configured to engage any type of flexure arm 28 without having to retract the finger 30 when the head 14 is loaded onto the disk 12.

The base plate 26 may include a clamp 34 that holds the flexure arm 28 while the HGA is loaded onto the tester. The finger 30 may be integrated into a pivot arm 36 that is pivotally connected to the base plate 26. The pivot arm 36 can be manually rotated between a loaded position and an unloaded position (shown in phantom). The loader 24 may further have a spring 38 to insure that the finger 30 is not rotated to an intermediate position.

FIG. 4 shows another embodiment of a finger 30' which has a dimple 40 that engages a flexure arm 28'. The dimple 40 can come into contact with a flexure arm 28' at a location between two wires 42 that extend along the arm 28'. The dimple 40 insures that the finger 30' does not damage the wires 42.

Figure 5A:
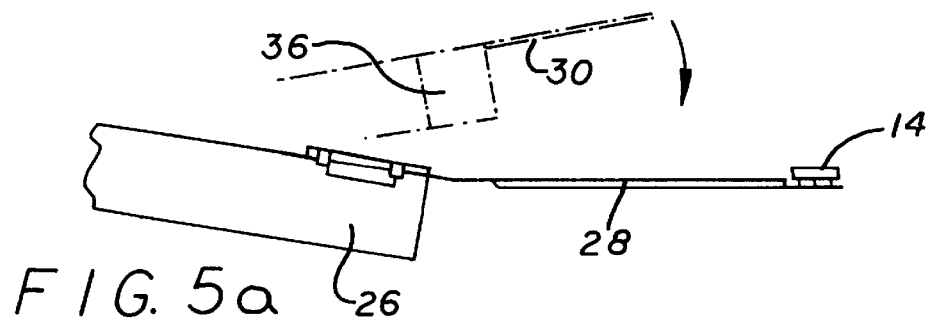
FIGS. 5a–5d are side views showing a head gimbal assembly being loaded onto a disk.
Figure 5B:
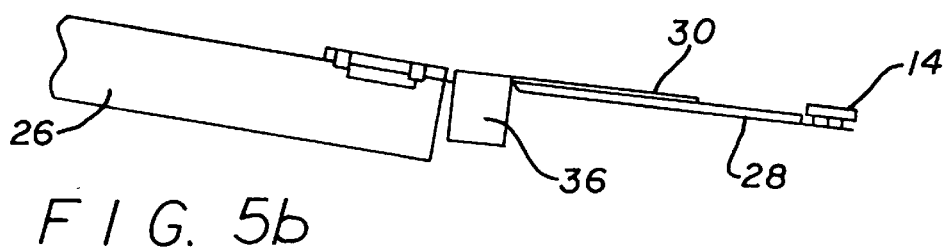
Figure 5C:
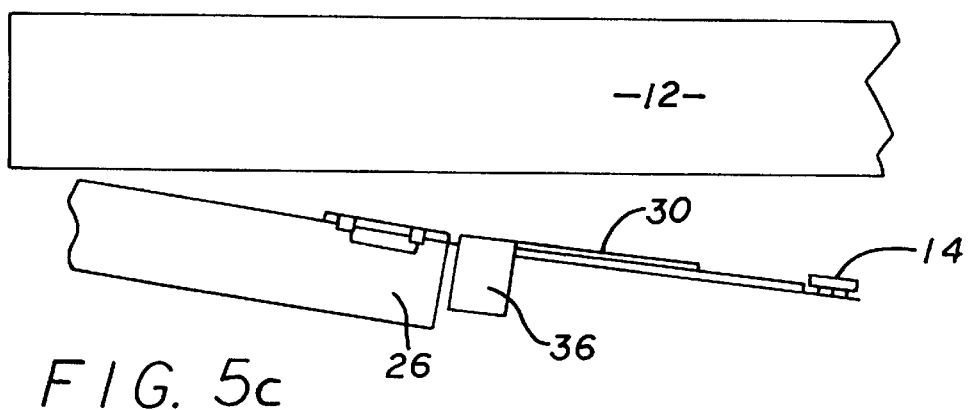

FIGS. 5a–5d are schematics which show the steps of loading the head 14 onto the disk 12. The flexure arm 28 and head 14 are initially loaded and clamped onto the base plate 26. As shown in FIG. 5b, the pivot arm 36 is then rotated to the loaded position so that the finger 30 engages the flexure arm 28. The linear actuator (not shown) then moves the head 14 below the disk 12 as shown in FIG. 5c. The finger 30 exerts a force to maintain the flexure arm 28 away from the disk surface to insure that the head 14 does not scratch the disk 12.

Figure 5D:
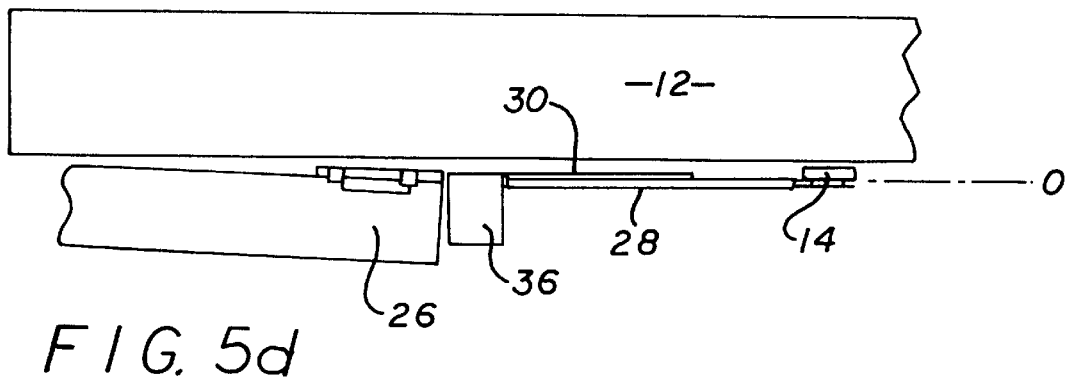

As shown in FIG. 5d, the base plate 26 can be rotated by the cam mechanism (not shown) to "load" the head 14 onto the disk 12. As the flexure arm 28 moves toward the disk 12 during the loading step, the head 14 cooperates with the air flow generated by the rotating disk 12 to create an air bearing between the disk 12 and the head 14.

The angle of the finger 30 is such that it does not make contact with the flexure arm 28 when the head 14 is fully loaded and "flying" on the disk 12. The height of the air bearing can then be measured by the flying height tester without retracting the finger 30. The tester can also be calibrated by moving the head 14 away from the disk 12 and then back toward the disk 12 in the loaded position. The calibration routine can also be performed without retracting the finger 30.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although a flying height tester is shown and described, it is to be understood that the loader of the present invention can be used in other systems such as a dynamic head tester, wherein the loader places the head adjacent to a magnetic disk.

What is claimed is:

1. A loader that loads a head onto a disk, the head being mounted to a flexure arm that has at least one rail which has a top edge, comprising:
    a base plate that supports the flexure arm; and,
    a finger that is operatively connected to said base plate and which engages the flexure arm at a location which does not make contact with the top edge of the rail.

2. The loader of claim 1, wherein said finger is pivotally connected to said base plate.

3. The loader of claim 1, wherein said finger includes a dimple that engages the flexure arm at a location between a pair of wires which extend along the flexure arm.

4. The loader of claim 1, wherein said base plate includes a clamp that captures the flexure arm.

5. The loader of claim 1, wherein said finger has a thickness that is less than a space which separates the flexure arm and the disk when the head is loaded onto the disk.

6. A method for loading a head onto a disk, the head being mounted to a flexure arm that has at least one rail which has a top edge, comprising:
    a) moving a finger into engagement with the flexure arm at a location which does not make contact with the top edge of the rail; and,
    b) moving the finger, the flexure arm and the head toward the disk to load the head onto the disk.

7. The method of claim 6, wherein the finger is rotated into the flexure arm.

8. The method of claim 6, further comprising the step of reflecting a beam of light from the head through the disk while the finger is located between the flexure arm and the disk.

9. The method of claim 8, further comprising the steps of detecting the reflected light beam and computing a space between the head and the disk.

10. A flying height tester that measures a space between a disk and a head that is mounted to a flexure arm, wherein the flexure arm has at least one rail that has a top edge, comprising:
    a transparent disk;
    a spin motor that rotates said transparent disk;
    a loader that places the head adjacent to said transparent disk, said loader having a base plate that supports the flexure arm and a finger that engages said flexure arm at a location that does not make contact with the top edge of the rail;
    a light source that reflects a light beam from the head through the transparent disk;
    a light detector that detects the reflected light beam; and,
    a computer that is coupled to said light detector and which computes the space from the detected light beam.

11. The tester of claim 10, wherein said finger is pivotally connected to said base plate.

12. The tester of claim 10, wherein said finger includes a dimple that engages the flexure arm at a location between a pair of wires which extend along the flexure arm.

13. The tester of claim 10, wherein said base plate includes a clamp that captures the flexure arm.

14. The tester of claim 10, wherein said finger has a thickness that is less than a space which separates the flexure arm and the disk when the head is loaded onto the disk.

* * * * *